United States Patent
Schlegel et al.

(12)

(10) Patent No.: US 6,309,620 B1
(45) Date of Patent: Oct. 30, 2001

(54) CARBONYL IRON SILICIDE POWDER

(75) Inventors: Reinhold Schlegel, Hassloch; Gabriele Friedrich, Mannheim, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/358,475

(22) Filed: Jul. 21, 1999

(30) Foreign Application Priority Data

Jul. 29, 1998 (DE) .............................. 198 34 236

(51) Int. Cl.⁷ .............................. C22C 29/12; B22F 9/16; C22B 5/20
(52) U.S. Cl. .......................... 423/326; 423/417; 423/594; 148/513; 75/233; 75/252; 75/361
(58) Field of Search .............................. 148/513; 75/233, 75/252, 362; 423/326, 417, 594

(56) References Cited

U.S. PATENT DOCUMENTS

| | | | |
|---|---|---|---|
| 4,305,016 | * 12/1981 | Schmidt . | |
| 4,978,498 | * 12/1990 | Yoshihiro et al. . | |
| 5,401,292 | * 3/1995 | Japka | ...................................... 75/233 |
| 5,866,273 | * 2/1999 | Wiggins et al. | ...................... 428/611 |
| 5,993,569 | * 11/1999 | Simon et al. | ........................ 148/307 |

FOREIGN PATENT DOCUMENTS

| | | |
|---|---|---|
| 228673 | 10/1985 | (DE) . |
| 19716882 | 10/1998 | (DE) . |
| 335213 | 10/1989 | (EP) . |
| 56-139603 | * 10/1981 | (JP) . |
| 57-043953 | * 3/1982 | (JP) . |
| 01-290704 | * 11/1989 | (JP) . |
| 02-232309 | * 9/1990 | (JP) . |

OTHER PUBLICATIONS

Perry et al., Perry's Condensed Chemical Engineers' Handbook, p. 19–20, 1997.*

Martin et al., *IEEE Trans. Magn.*, 26(5), Sep. 5, 1990, pp. 2223–2225.

Abdellaoui et al., *J. de Physique IV*, vol. 2, Dec. 1992, pp. C3–73 to C3–78.

Song et al., *J. of Mat. Sci. Letters*, vol. 14, 1995, pp. 1715–1717. (No Month).

* cited by examiner

*Primary Examiner*—David R. Sample
(74) *Attorney, Agent, or Firm*—Keil & Weinkauf

(57) ABSTRACT

A process for preparing carbonyl iron silicide comprises heat treatment of an iron/silicon mixture comprising a) from 20 to 99.9% by weight of finely divided carbonyl iron and b) from 0.1 to 80% by weight of finely divided silicon powder. Also provided are a carbonyl iron silicide obtainable by alloying carbonyl iron with silicon and a carbonyl iron suicide which has a higher inductance than carbonyl iron powder.

18 Claims, No Drawings

CARBONYL IRON SILICIDE POWDER

The present invention relates to carbonyl iron suicide powders and a process for preparing them.

Finely divided iron powders in which a low proportion of secondary constituents is important are required for many applications in powder metallurgy, electro-technology, in chemistry and pharmacy. For certain applications, a defined silicon content of the powders is desirable in addition to the high purity. Thus, it is known that the addition of silicon influences the magnetic properties of iron powders. Furthermore, the catalytic action of iron-silicon alloys, for example in the hydrogenation of CO in the Fischer-Tropsch process, is known from the literature. In addition, iron-silicon alloys are more resistant to environmental influences than is pure iron.

High-purity, silicon-containing iron powders can be obtained by gas-phase reaction of volatile iron and silicon compounds. Such a process is described in DE-A 197 16 882 which has earlier priority but is not a prior publication. A further possible method is preparation from the elements.

The preparation of high-purity, silicon-containing iron powders from the elements is today frequently carried out by mechanical alloying, e.g. by milling the raw materials in ball mills. Mechanical alloying processes are described in V. E. Martin et al., IEEE Trans. Magn. 26 (1990), pages 2223–25 and in M. Abdellaoui et al., J. Phys. IV (1992), C3, pages 73–78. Disadvantages of these processes are the very long processing times which extend from tens to hundreds of hours.

Thermal processes for preparing iron-silicon alloys are described, for example, in DD-A 228 673 and EP-A 0 335 213. In these processes, element and alloy powders are pressed and sintered under high pressure. These processes are not directed at the preparation of powders; rather, finished shaped bodies such as magnetic cores and thermocouples are obtained.

T. H. Song et al., J. Mater. Sci. Lett. 14 (1995), pages 1715–17, describe the preparation of iron-silicon alloys in a "self-propagating high-temperature synthesis". Here, a mixture of iron and silicon powders together with 20% by weight of $KNO_3$ is pressed at 100 MPa to form tablets and is subsequently ignited in an electric arc discharge. The process is complicated in chemical engineering terms and is not without hazards because of the use of $KNO_3$.

It is an object of the present invention to prepare iron-silicon alloy powders which are suitable for many applications from the elements by a simple and inexpensive process.

We have found that this object is achieved by a process for preparing carbonyl iron suicide by heat treatment of an iron/silicon mixture comprising a) from 20 to 99.9% by weight of finely divided carbonyl iron and b) from 0.1 to 80% by weight of silicon powder, where the sum of the components a) and b) is 100% by weight.

For the purposes of the present invention carbonyl iron silicide is iron suicide which is obtainable by alloying carbonyl iron powder with silicon.

In the process of the present invention, alloying is carried out by heat treatment of a mixture of finely divided carbonyl iron powder and silicon powder.

For the purposes of the present invention, finely divided carbonyl iron encompasses carbonyl iron powder and carbonyl iron whiskers.

Carbonyl iron powder and carbonyl iron whiskers can be obtained by known methods by thermal decomposition of iron pentacarbonyl in the gas phase, e.g. as described in Ullmann's Encyclopedia of Industrial Chemistry, 5th Edition, Vol. A 14, page 599, or in DE-A 34 28 121 or in DE-A 39 40 347, and consist of particularly pure metallic iron. The high purity of the powder or whiskers is a result of the high purity of the iron pentacarbonyl. Depending on the decomposition conditions (pressure, temperature), powder or whiskers are formed.

Carbonyl iron powder is a gray, finely divided powder which is made up of metallic iron having a low content of secondary constituents and consists essentially of spherical particles having a mean particle diameter of up to 10 $\mu$m.

In the process of the present invention, it is possible to use mechanically hard, unreduced carbonyl iron powders or mechanically soft, reduced carbonyl iron powders.

The unreduced carbonyl iron powders preferably used in the process of the present invention have an iron content of >97% by weight, a carbon content of <1.0% by weight, a nitrogen content of <1.0% by weight and an oxygen content of <0.5% by weight. The mean particle diameter of the powder particles is preferably from 1 to 10 $\mu$m, particularly preferably from 1.5 to 5.0 $\mu$m, and their specific surface area (BET) is preferably from 0.2 to 2.5 $m^2/g$.

The reduced carbonyl iron powders preferably used in the process of the present invention have an iron content of >99.5% by weight, a carbon content of <0.05% by weight, a nitrogen content of <0.1% by weight and an oxygen content of <0.6% by weight. The mean particle diameter of the powder particles is preferably 1–8 $\mu$m, particularly preferably 2–8 $\mu$m. The specific surface area of the powder particles is preferably 0.2–2.5 $m^2/g$.

Carbonyl iron whiskers are very fine, polycrystalline iron threads. The carbonyl iron whiskers preferably used in the process of the present invention consist of thread-like assemblies of spheres having sphere diameters of 0.1–1 $\mu$m, with the threads having different lengths and being able to form balls, and have an iron content of >83.0% by weight, a carbon content of <8.0% by weight, a nitrogen content of <4.0% by weight and an oxygen content of <7.0% by weight.

The carbonyl iron powders and whiskers preferably used in the process of the present invention have a very low content of extraneous metals which is usually below the detection limit of atomic absorption analysis and is due to the preparation from the very pure starting compound iron pentacarbonyl. The carbonyl iron powders contain, inter alia, the following proportions of further, extraneous elements: nickel<100 ppm, chromium<150 ppm, molybdenum<20 ppm, arsenic<2 ppm, lead<10 ppm, cadmium<1 ppm, copper<5 ppm, manganese<10 ppm, mercury<1 ppm, sulfur<10 ppm, silicon<10 ppm and zinc<10 ppm.

Preference is given to using carbonyl iron powders in the process of the present invention.

As finely divided silicon, commercial silicon powder can be used in the process of the present invention. Preference is given to using a silicon powder of high purity. The silicon content of the silicon powders used is generally >95% by weight, preferably >98% by weight, particularly preferably >99% by weight. The proportion of extraneous metals (apart from iron) is generally <2% by weight, preferably <1% by weight, particularly preferably <0.5% by weight. The mean particle size of the silicon powders used is generally <1000 $\mu$m, preferably <500 $\mu$m.

The carbonyl iron silicide is prepared by intimate mixing of the finely divided carbonyl iron with the silicon powder and subsequent heat treatment. The proportion of silicon in the mixture is generally from 0.1 to 80% by weight, preferably from 0.5 to 30% by weight, particularly preferably from 1 to 20% by weight. The heat treatment is generally carried out by heating the iron/silicon mixture to a reaction temperature of generally ≧700° C., preferably ≧900° C., particularly preferably from 900° C. to 1100° C., in particular 1000° C., over a period of from 20 to 80 minutes, preferably from 30 to 60 minutes, and holding it at this temperature for a period of from 80 to 160 minutes, preferably from 100 to 140 minutes.

In a further embodiment, the iron/silicon mixture comprises carbonyl iron and silicon and additionally c) elemental copper and/or at least one copper compound, elemental aluminum and/or at least one aluminum compound or elemental cobalt and/or at least one cobalt compound, in proportions of from 0.01 to 5% by weight, preferably from 0.1 to 2% by weight, based on the sum of the components a), b) and c). Preferred copper compounds are copper(II) salts such as copper (II) sulfate or copper(II) oxalate; particular preference is given to copper(II) sulfate.

The iron/silicon mixture preferably consists of the components a), b) and, if desired, c) and contains no further components apart from these.

The addition of copper and/or copper compounds, aluminum and/or aluminum compounds or cobalt and/or cobalt compounds has the surprising effect that, under otherwise identical conditions, significantly lower reaction temperatures can be employed. The reaction temperature is then generally above 500° C., preferably above 700° C., particularly preferably from 700 to 900° C., in particular about 800° C.

The heat treatment can be carried out on the loose-mixed starting components without a prior pressing to form shaped bodies. To prevent the formation of oxides, the heat treatment is preferably carried out in a protective gas atmosphere with exclusion of atmospheric oxygen. As protective gases, it is possible to use completely inert gases, for example argon, or reducing gases, preferably hydrogen, and also mixtures thereof. When using hydrogen as a constituent of the protective gas, secondary constituents such as carbon, oxygen and nitrogen are at least partly reduced to the corresponding volatile hydrogen compounds during the formation of the iron silicide and a particularly pure product is thus obtained. In this way, for example, the carbon content can be lowered to <0.1% by weight and the nitrogen content to <0.01% by weight. The proportion of the secondary constituents oxygen, carbon and nitrogen has an effect, in particular, on the mechanical properties of the carbonyl iron silicide formed.

In a preferred embodiment, the heat treatment is carried out in a hydrogen atmosphere or a hydrogen-containing atmosphere. It is preferably carried out at atmospheric pressure.

In a further preferred embodiment of the process of the present invention, the product obtained in the heat treatment is mechanically comminuted to form a powder. The mean particle size of the carbonyl iron silicide powders obtained is generally from 0.1 to 1000 μm, preferably from 1 to 50 μm.

In addition to iron and silicon, the carbonyl iron silicide formed may further comprise, inter alia, one or more of the phases FeSi, $Fe_3Si$ (C, gupeiite and suessite), $Fe_5Si_3$ (xifengite), $Fe_5Si$ and $FeSi_2$. A particular advantage is the low proportion of extraneous metals which is typically <1% by weight, preferably <0.5% by weight, particularly preferably <0.1% by weight. Specifically, the nickel content can be <100 ppm, the chromium content <150 ppm, the molybdenum content <20 ppm, the arsenic content <2 ppm, the lead content <10 ppm, the cadmium content <1 ppm, the manganese content <10 ppm, the mercury content <1 ppm and the zinc content <10 ppm. The content of extraneous metals can be determined by means of atomic absorption spectrometry.

A further advantage is that the process of the present invention can be carried out under mild conditions and in a simple manner in process engineering terms. Thus, simple heating of the starting components under atmospheric pressure in a protective gas atmosphere is sufficient. The low temperatures and the short reaction times at which formation of iron silicide occurs under these conditions are particularly surprising. Thus, heat treatment for from 1 to 2 hours under the abovementioned conditions may be sufficient. The process of the present invention can be carried out in such a way that the structure of the carbonyl iron used is essentially retained in the carbonyl iron silicide formed, which may, inter alia, have a positive effect on its electromagnetic properties.

The carbonyl iron silicide of the present invention can be processed to form microwave-absorbing material. For this purpose, the powders can be introduced into plastic or rubber-like materials as well as into surface coating systems. The carbonyl iron suicide of the present invention can also be pressed to produce soft-magnetic shaped bodies for electronic components, for example magnetic cores.

Owing to its silicon content, the carbonyl iron silicide of the present invention has increased corrosion resistance and a higher inductance compared to carbonyl iron powder. It can therefore be used widely.

The invention is illustrated by the following examples.

EXAMPLES 1 to 20

In an analytical mill, carbonyl iron powder (BASF AG, Ludwigshafen, Germany) of the grade indicated and silicon powder SiMP2 from H. C. Starck (specification: Si>98% by weight, C 0.04% by weight, O 1.17% by weight, Fe 0.27% by weight, Al 0.15% by weight, Ca 0.08% by weight) or Merck silicon powder (specification: Si>99%, constituents which are not volatile with HF or $HNO_3$<0.5%) are milled for about 1 minute. The powder mixture is placed in quartz boats and introduced into a heatable tube made of fused quartz. The fused quartz tube is first flushed at room temperature with argon, then with hydrogen and heated to an initial temperature of 400° C. while maintaining a flow of hydrogen. It is subsequently heated while passing a stream of hydrogen through it (10–20 standard 1/h) to the temperature indicated in the table over a period of from 1 to 2 hours, this temperature is held for about 1–2 hours and the tube is then cooled to room temperature. Condensable reaction products which are given off, including $H_2O$ and $NH_3$, are condensed out at −78° C. in a cold trap at the outlet of the tube. This gives a gray, partly caked product which can be crushed in air. According to X-ray diffraction analysis, the product comprises the phases FeSi, $Fe_3Si$, $Fe_5Si_3$ and $FeSi_2$ in addition to iron.

The table summarizes the results.

Composition of the Powders [in % by weight]:

Example 8: Fe 85; Si 10.2; C 3.6; H<0.5; N<0.5; O 0.23

Example 9: Fe 88; Si 10.2; C<0.5; H<0.5; N<0.5; O 0.5

Example 10: Fe 88; Si 9.7; C<0.5; H<0.5; N<0.5; O 0.05

Example 19: Fe 89.4; Si 9.9; C 0.46; H<0.5; N<0.5; O 0.05

Measurements of the Inductance of the Carbonyl Iron Silicide Powder

The measurements were carried out using an HP Q-meter 4342 on toroids having dimensions of 20.4×12.4 mm. The toroids were produced by pressing the corresponding carbonyl iron silicide or carbonyl iron powder together with 4.5% of Epicote (binder) at a pressure of 0.345 GPa and wound with 0.5 mm copper wire (30 windings). The measured inductance for carbonyl iron powder at 5 MHz was assigned a value of 100% for comparison with the measured values for the carbonyl iron silicide powders (5 MHz).

| Measured values: | | |
|---|---|---|
| | Relative inductance (5 MHz) | Further properties of the powder |
| Carbonyl iron powder | 100% | - Reference - |
| Carbonyl iron silicide powder | 104% | cf. Example No. 9 |
| Carbonyl iron silicide powder | 162% | cf. Example No. 19 | a) from 20 to 99.9% by weight of finely divided carbonyl iron and b) from 0.1 to 80% by weight of finely divided silicon powder, and, optionally, c) from 0.1 to 2% by weight, based on the sum of the components a), b) and c), of elemental copper and/or at least one copper compound, elemental aluminum and/or at least one aluminum compound or elemental cobalt and/or at least one cobalt compound, and, in addition to a), b) and c), no more than 100 ppm nickel, 150 ppm chromium, 20 ppm molybdenum, 2 ppm arsenic, 10 ppm lead, 1 ppm cadmium, 10 ppm manganese, 1 ppm mercury and 10 ppm zinc, (ii) mechanically comminuting the carbonyl iron silicide formed after the heat treatment.

2. A process as claimed in claim 1, wherein the iron/silicon mixture further comprises c) from 0.1 to 2% by weight, based on the sum of the components a), b) and c), of elemental copper and/or at least one copper compound, elemental aluminum and/or at least one aluminum compound or elemental cobalt and/or at least one cobalt compound.

TABLE

| No. | Iron powder | Silicon [% by wt] | Further component | Initial weight [g] | Final weight [g] | Weight loss [g] | Furnace temp. [° C.] | X-ray analysis |
|---|---|---|---|---|---|---|---|---|
| 1 | HS 5103 | 10 Si Merck | — | 16.00 | 15.79 | 0.21 | 1000 | Fe, $Fe_3Si$, Si |
| 2 | SM 6256 | 10 Si Merck | — | 16.00 | 15.35 | 0.65 | 1000 | Fe, Si, plus a small amount of $Fe_3Si$ |
| 3 | HQ 6926 | 10 Si(MP2) | — | 10.01 | 10.12 | −0.11 | 1000 | Fe, $Fe_3Si$ (suessite) |
| 4 | CIW/C 7591 | 10 Si(MP2) | — | 10.00 | 9.70 | 0.30 | 1000 | Fe, $Fe_3Si$, plus traces of FeSi and $Fe_5Si_3$ |
| 5 | CIW/C 7591 | 10 Si(MP2) | — | 10.00 | 9.15 | 0.85 | 800 | $Fe_3Si$, Fe, plus traces of Si |
| 6 | CIW/C 7591 | 10 Si(MP2) | — | 10.00 | 9.26 | 0.74 | 1000 | $Fe_3Si$ (as C, gupeiite and suessite) |
| 7 | HQ 6926 | 10 Si(MP2) | — | 10.00 | 9.76 | 0.24 | 1000 | $Fe_3Si$ (suessite) |
| 8 | CIW/C 7591 | 10 Si(MP2) | — | 20.00 | 18.78 | 1.22 | 1000 | $Fe_3Si$ (as C, gupeiite and suessite) |
| 9 | HQ 6926 | 10 Si(MP2) | — | 15.00 | 14.65 | 0.35 | 900 | $Fe_3Si$ (suessite) |
| 10 | SU 5713 | 10 Si(MP2) | — | 15.00 | 14.90 | 0.10 | 1000 | $Fe_3Si$ (suessite) |
| 11 | HQ 6926 | 15 Si(MP2) | — | 20.00 | 19.64 | 0.36 | 1000 | $Fe_3Si$ (C and/or gupeiite) |
| 12 | HQ 6926 | 25 Si(MP2) | — | 40.00 | 39.31 | 0.69 | 1000 | FeSi, $Fe_5Si_3$ (xifengite) |
| 13 | HQ 6926 | 20 Si(MP2) | — | 42.00 | 41.27 | 0.73 | 1000 | Fe, $Fe_5Si_3$, (xifengite), plus a little Si |
| 14 | CIW/C 8163 | 15 Si(MP2) | — | 37.00 | 35.53 | 1.47 | 900 | $Fe_3Si$, some Fe, traces of Si and $Fe_5Si_3$ |
| 15 | CIW/C 8163 | 20 Si(MP2) | — | 37.00 | 35.98 | 1.02 | 900 | $Fe_3Si$, traces of $Fe_5Si_3$, SiC, $FeSi_2$, FeSi |
| 16 | CIW/C 8163 | 25 Si(MP2) | — | 37.00 | 36.01 | 0.99 | 900 | $Fe_3Si$, $Fe_5Si_3$, SiC, traces of $FeSi_2$, FeSi |
| 17 | HQ 6926 | 10 Si(MP2) | — | 35.80 | 35.00 | 0.80 | 900 | $Fe_3Si$ (suessite) |
| 18 | CIW/C 8163 | 10 Si(MP2) | 1.0% by wt. of Cu(II) as sulfate | 40.50 | 38.68 | 1.82 | 800 | $Fe_3Si$ (predominantly C), traces of Cu |
| 19 | EN 9601 | 10 Si(MP2) | — | 69.26 | 68.42 | 0.84 | 1000 | $Fe_3Si$ (suessite), traces of Si and $SiO_2$ |
| 20 | EL 1097 | 10 Si(MP2) | — | 70.08 | 69.10 | 0.98 | 1000 | $Fe_3Si$ (suessite, gupeiite) traces of $CaCO_3$, Si |

We claim:

1. A process for preparing carbonyl iron silicide powder, comprising the steps of (i) heat treatment of an iron/silicon mixture consisting of 3. A process as claimed in claim 1, wherein the iron/silicon mixture is heated to a temperature in the range from 500 to 1100° C.

4. A process as claimed in claim 2, wherein the iron/silicon mixture is heated to a temperature in the range from 700 to 900° C.

5. A process as claimed in claim 1, wherein the iron/silicon mixture is heated in a reducing atmosphere.

6. A process as claimed in claim 1, wherein the iron/silicon mixture is heated at atmospheric pressure.

7. A process for preparing carbonyl iron silicide powder consisting essentially of the steps:
   (i) heat treating an iron/silicon mixture consisting essentially of
      (a) from 20 to 99.9% by weight of finely divided carbonyl iron,
      (b) from 0.1 to 80% by weight of finely divided silicon powder and, optionally,
      c) from 0.1 to 2% by weight, based on the sum of the components a), b) and c), of elemental copper and/or at least one copper compound, elemental aluminum and/or at least one aluminum compound or elemental cobalt and/or at least one cobalt compound, and
   (ii) mechanically comminuting the carbonyl iron silicide formed by the heat treatment.

8. A process as claimed in claim 7 wherein the optional component c) is present.

9. A process as claimed in claim 8, wherein the iron/silicon mixture is heated to a temperature in the range from 700 to 900° C.

10. A process as claimed in claim 7, wherein the iron/silicon mixture is heated to a temperature in the range from 500 to 1100° C.

11. A process as claimed in claim 7, wherein the iron/silicon mixture is heated in a reducing atmosphere.

12. A process as claimed in claim 7, herein the iron/silicon mixture is heated at atmospheric pressure.

13. A process for preparing carbonyl iron silicide powder consisting essentially of the steps:
   (i) heat treating an iron/silicon mixture consisting essentially of
      (a) from 20 to 99.9% by weight of finely divided carbonyl iron,
      (b) from 0.1 to 80% by weight of finely divided silicon powder and, optionally,
      c) from 0.1 to 2% by weight, based on the sum of the components a), b) and c), of elemental copper and/or at least one copper compound, elemental aluminum and/or at least one aluminum compound or elemental cobalt and/or at least one cobalt compound, and
      no further components apart from a), b) and c), and
   (ii) mechanically comminuting the carbonyl iron silicide formed by the heat treatment.

14. A process as claimed in claim 13, wherein the optional component c) is present.

15. A process as claimed in claim 14, wherein the iron/silicon mixture is heated to a temperature in the range from 700 to 900° C.

16. A process as claimed in claim 13, wherein the iron/silicon mixture is heated to a temperature in the range from 500 to 1100° C.

17. A process as claimed in claim 13, wherein the iron/silicon mixture is heated in a reducing atmosphere.

18. A process as claimed in claim 13, wherein the iron/silicon mixture is heated at atmospheric pressure.

* * * * *

UNITED STATES PATENT AND TRADEMARK OFFICE
CERTIFICATE OF CORRECTION

PATENT NO. : 6,309,620 B1
DATED : October 30, 2001
INVENTOR(S) : Schlegel et al.

It is certified that error appears in the above-identified patent and that said Letters Patent is hereby corrected as shown below:

Column 6,
Line 17, delete the material after "wherein" through the end of the claim and substitute -- optional component c) is used --.

Signed and Sealed this

Ninth Day of July, 2002

Attest:

JAMES E. ROGAN
Attesting Officer          Director of the United States Patent and Trademark Office